US012600474B2

(12) United States Patent
Franchi et al.

(10) Patent No.: US 12,600,474 B2
(45) Date of Patent: Apr. 14, 2026

(54) AIRCRAFT CAPABLE OF HOVERING AND METHOD FOR TRANSPORTING A LOAD SUSPENDED FROM SUCH AIRCRAFT

(71) Applicant: LEONARDO S.P.A., Rome (IT)

(72) Inventors: Filippo Franchi, Samarate (IT); Fabio Iasi, Samarate (IT); Daniele Robustelli, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/671,321

(22) Filed: May 22, 2024

(65) Prior Publication Data

US 2024/0308661 A1    Sep. 19, 2024

Related U.S. Application Data

(62) Division of application No. 17/927,194, filed as application No. PCT/IB2021/054602 on May 26, 2021, now Pat. No. 12,351,311.

(30) Foreign Application Priority Data

May 26, 2020    (EP) .................................... 20176645

(51) Int. Cl.
*B64D 1/22*        (2006.01)
*B64C 27/04*        (2006.01)
        (Continued)

(52) U.S. Cl.
CPC ................ *B64D 1/22* (2013.01); *B64C 27/04* (2013.01); *B66D 1/54* (2013.01); *F16F 3/0876* (2013.01);
        (Continued)

(58) Field of Classification Search
CPC ... B64D 1/22; B66D 1/26; B66D 1/40; B66D 1/42; B66D 1/54; A62B 35/04; A63B 29/028; D07B 2201/2083
See application file for complete search history.

(56) References Cited

U.S. PATENT DOCUMENTS 4,005,852 A    2/1977  Schmitmeyer et al.
4,563,869 A    1/1986  Stanton
        (Continued)

FOREIGN PATENT DOCUMENTS

CA        2370897 A1 *  8/2002
CN        109878732 A    6/2019
        (Continued)

OTHER PUBLICATIONS

International Search Report and Written Opinion in corresponding International Patent Application No. PCT/IB2021/054602, mailed Aug. 2, 2021 (16 pages).
        (Continued)

*Primary Examiner* — Joshua J Michener
*Assistant Examiner* — Ryan Andrew Yankey
(74) *Attorney, Agent, or Firm* — Leason Ellis LLP

(57)        ABSTRACT

There is described an aircraft configured to be able to hover, comprising a fuselage; and a support element adapted to support a load, made of elastically deformable material and constrained to said fuselage; the support element being movable in an operating position in which it is arranged at least partially outside said fuselage and supports said load; the aircraft comprises a sock surrounding the support element arranged in said operating position; the sock is configured to contain the elastic return of the support element, in case the support element arranged in said operating position is sheared off.

6 Claims, 7 Drawing Sheets

(51) Int. Cl.
  *B66D 1/54* (2006.01)
  *F16F 3/087* (2006.01)
(52) U.S. Cl.
  CPC ... *F16F 2230/0023* (2013.01); *F16F 2232/08*
    (2013.01); *F16F 2236/06* (2013.01)

(56) References Cited

U.S. PATENT DOCUMENTS

| | | | |
|---|---|---|---|
| 7,827,895 B2 | 11/2010 | Wang | |
| 10,150,565 B2* | 12/2018 | Stucki | F16M 13/02 |
| 10,479,502 B2 | 11/2019 | Barbieri | |
| 2003/0080327 A1 | 5/2003 | Dorr | |
| 2004/0050343 A1 | 3/2004 | Kutgis | |
| 2015/0241198 A1* | 8/2015 | Limvorapun | B64D 1/22 |
| | | | 702/151 |
| 2016/0340038 A1 | 11/2016 | Chavez | |

FOREIGN PATENT DOCUMENTS

| | | | |
|---|---|---|---|
| EP | 2143633 | A1 | 1/2010 |
| GB | 2513646 | A | 11/2014 |
| KR | 20100058442 | A | 6/2010 |

OTHER PUBLICATIONS

International Preliminary Report on Patentability in PCT Application No. PCT/IB2021/054602, mailed Nov. 2, 2021(8 pages).
Restriction Requirement in U.S. Appl. No. 17/927,194, mailed Mar. 15, 2024 (9 pages).
"Studying the Rehabilitation of Existing Structures Using Compound System of Cables and Shape Memory Alloys," Seyed Zahrai, Dec. 2009 (Year: 2009).
"Exploring the Stress/Strain Curve for Mild Steel," the Chicago Curve, Feb. 14, 2018 (Year: 2018).
Non Final Office Action in US Application No. 17/927, 194, mailed Jul. 15, 2024 (18 pages).

* cited by examiner

AIRCRAFT CAPABLE OF HOVERING AND METHOD FOR TRANSPORTING A LOAD SUSPENDED FROM SUCH AIRCRAFT

CROSS-REFERENCE TO RELATED APPLICATIONS

This patent application is a divisional of U.S. patent application Ser. No. 17/927,194, filed Nov. 22, 2022, which is a U.S. National Phase Application under 35 U.S.C. § 371 of International Patent Application No. PCT/IB2021/054602, filed on May 26, 2021, which claims priority from European Patent Application No. 20176645.8 filed on May 26, 2020, all of which are incorporated by reference, as if expressly set forth in their respective entireties herein.

TECHNICAL FIELD

The present invention relates to an aircraft capable of hovering, in particular a helicopter or a convertiplane.

The present invention also relates to a method for transporting a load suspended from the aforesaid aircraft.

BACKGROUND ART

Aircrafts capable of hovering are used in an advantageous way to recover and/or transport people or objects in emergency situations and/or in places that are difficult to access, for example to recover shipwrecked people from the sea or to unload materials in inaccessible areas.

In greater detail, according to a first known solution, the aircraft comprise a winch carried by a fixed structure of the aircraft and a rescue equipment (for example a harness or a stretcher) suspended from a steel cable moved by the winch.

More precisely, the aforesaid aircrafts comprise an opening adapted to allow the crew access the fuselage, obtained in a lateral side of the fuselage itself and engaged by a hatch during normal flight operations.

In order to perform a recovery, the hatch is brought to a position in which it leaves the access to the opening free, the rescue equipment is first lowered and, subsequently, lifted with the people and/or objects to be recovered.

At this point, the rescue equipment is brought back, manually or through appropriate tools and through the opening, inside the aircraft fuselage.

During the descent and ascent operation of the rescue equipment, the free length of the steel cable respectively increases and decreases.

According to a further solution of the known type, the aircrafts comprise a barycentric hook connected to the fuselage in a barycentric position by means of a rope.

The barycentric hook is used for the transport of loads outside the aircraft, in particular for bulky and/or heavy loads to be unloaded in the inaccessible area.

Generally, the use of the barycentric hook requires the use of specialized personnel who hook the load to the barycentric hook, when the aircraft is hovering.

The load is unhooked by an electric command or manually by operating directly on the hook.

A typical application of the barycentric hook is the transport of a bucket filled with water to be released in an area affected by a fire.

While using the barycentric hook, the length of the rope remains substantially constant.

In the event of breakage, the steel cable in the first solution of the known type or the rope in the second solution of the known type can be subject to an elastic rebound directed upwards, that is towards the helicopter.

Said elastic rebound creates the risk of the steel cable or the rope of impacting against the aircraft, in particular against the rotors of the same aircraft.

Said impact clearly constitutes a danger to the safety of the aircraft itself.

There is a need felt in the sector to limit the risk of impact of the steel cable or of the rope against the aircraft, in case of breakage of the same.

More specifically, there is a need felt in the sector to contain the elastic rebound of the steel cable or of the rope, altering as little as possible the structural properties of the cable or of the rope themselves, that is, without weakening the cable or the rope themselves and without altering the stiffnesses of the same.

Furthermore, there is a need felt in the sector to contain said elastic rebound, preserving as much as possible the possibility of easily inspecting the cable or the rope themselves.

There is also a need felt in the sector to contain said elastic rebound without causing an excessive increase in weight of the aircraft.

With particular reference to the further known solution provided with a barycentric hook, there is a need felt in the sector to contain the elastic rebound of the rope, at the same time increasing the protection against atmospheric agents and reducing the risk of damage due to the impact against bodies having pointed edges.

U.S. Pat. No. 4,005,852 describes a winch recovery device of a helicopter capable of generating a warning signal in case of malfunction.

U.S. Pat. No. 10,150,565 and GB-A-2513646 illustrate helicopters equipped with a barycentric hook.

CN-A-109878732 discloses a sampling drone, which aims to improve the efficiency of sampling and reduce the labor intensity of geologist. The sampling drone comprises a drone body, a lifting mechanism and a grasping mechanism. The lifting mechanism comprises a first electromagnet, a first armature, a first sleeve, a first push-pull member, and a first elastic member. One end of the first sleeve is fixed to the unmanned body while the other end is provided with a first fixing member. The first electromagnet is disposed in the first sleeve and the first armature is slidably sleeved in the first sleeve. The first armature is disposed opposite to the first electromagnet, one end of the first push-pull member is connected to the first armature, and the other end of the first push-pull member is provided with a sliding portion, and the sliding portion is movable passing through the first fixing member. The first elastic member is disposed between the first armature and the first fixing member, and the first armature is configured to be energized at the first electromagnet. The first armature is configured to drive the first push-pull member to move toward the first electromagnet.

CA-A-2370897 discloses a helicopter wear line cover for protecting and separating a load bearing cable used for lifting a load suspended from a helicopter from a non-load bearing cable used for controlling the release of the load which includes a pair of elongated flat side members connected together longitudinally along two lines of attachment to form a first tube between the side members, a first attachment member attached to one of the side members adjacent a first edge and a second attachment member attached to the other of the side member s remote from the first edge. When the first and second attachment members are attached together, the side members form a second tube parallel with the first tube and separated from the tube by one of the side members and the diameters of the first and second tubes are large enough to enable free longitudinal movement of the cables within the first and second tubes when the first and second attachment members are attached together.

DISCLOSURE OF INVENTION

The object of the present invention is to provide an aircraft capable of hovering capable of satisfying at least one of the aforesaid needs in a simple and economic way.

The aforesaid object is achieved by the present invention, in that it relates to an aircraft capable of hovering according to what is defined in the claims.

The present invention also relates to a method for transporting a load suspended from the aforesaid aircraft as defined in the claims.

BRIEF DESCRIPTION OF THE DRAWINGS

For a better understanding of the present invention, a preferred embodiment is described below, by way of a non-limiting example and with reference to the accompanying drawings, wherein.

BEST MODE FOR CARRYING OUT THE INVENTION

With reference to the attached figures, 1 indicates an aircraft capable of hovering, that is, of keeping flying at constant height and at zero speed.

The aircraft 1 is, in the case illustrated, a helicopter.

Alternatively, the aircraft 1 could be a convertiplane or a drone/UAV.

Figure 1:
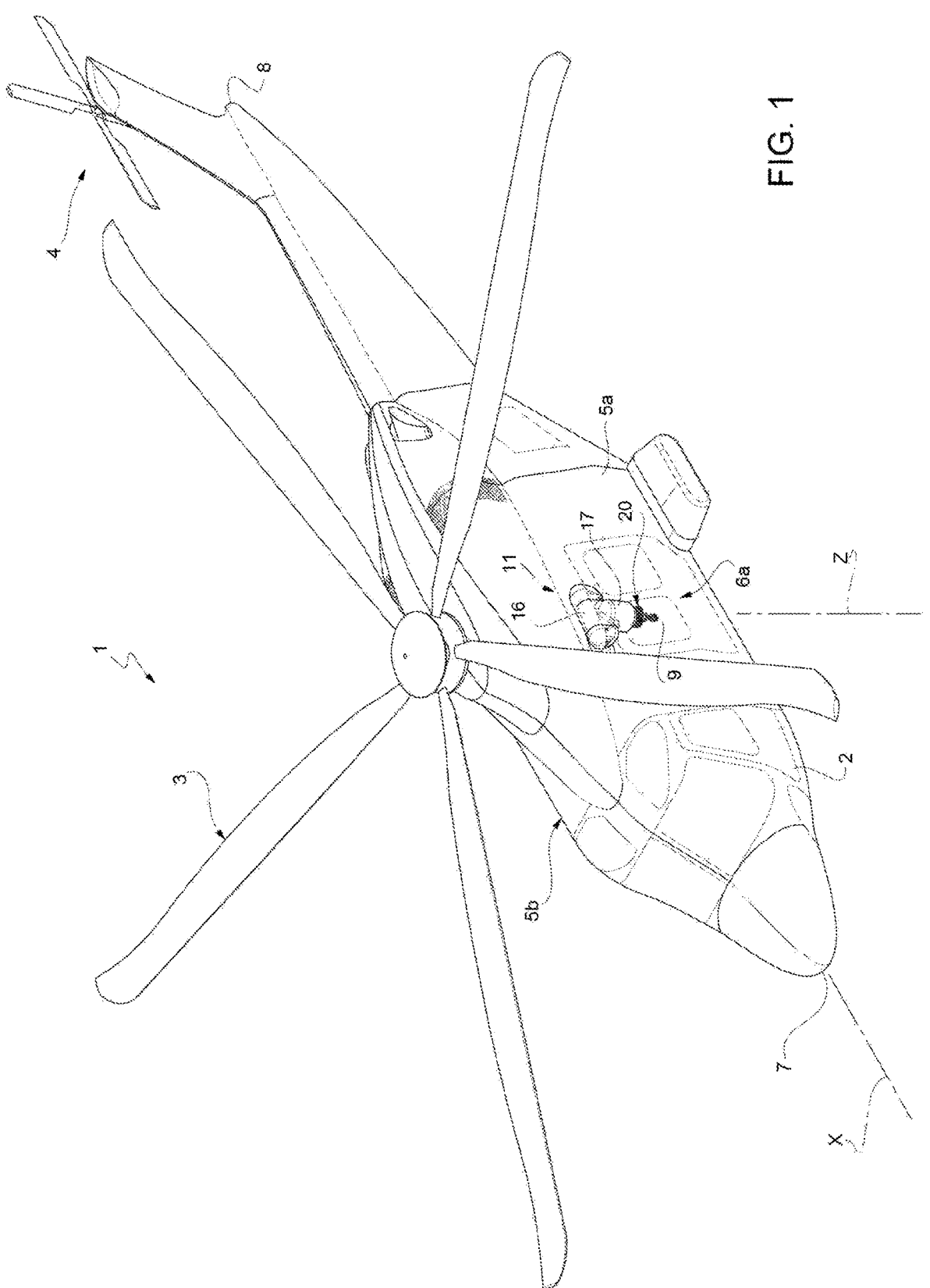
FIG. 1 is a perspective view of an aircraft capable of hovering according to the present invention and comprising a load lifting/lowering device.

With reference to FIG. 1, 1 indicates in particular a helicopter essentially comprising:

a fuselage 2;

a main rotor 3 placed at a top of the fuselage 2 and rotatable around a first axis; and an anti-torque rotor 4 placed at one tail end of the fuselage 2 and rotatable around its own second axis transversal to the first axis.

In greater detail, the fuselage 2 comprises a pair of lateral sides 5a, 5b defining respective openings 6a, 6b for accessing the fuselage 2.

The fuselage 2 also comprises a nose 7 and a tail 8.

It is possible to identify a longitudinal axis X of the helicopter 1 directed from nose 7 to tail 8.

It is also possible to identify an axis Z orthogonal to the axis X and arranged vertically, when the helicopter 1 is on the ground or in a normal flight configuration.

The helicopter 1 further comprises a transport device 9 for transporting a load 10, for example a recovery basket or a harness or a stretcher.

In the case illustrated in FIGS. 1 to 5, the transport device 9 is adapted to allow the load 10 to be lifted on board the fuselage 2 or the load 10 to be lowered towards the ground.

In greater detail, the transport device 9 comprises:

a box 11 protruding in a cantilevered manner from the side 5a, 5b outside the fuselage 2;

a winch 12 housed inside the box 11; and a cable 13 wound on the winch 12 and sliding in a vertical direction and provided with a hook 14 for supporting the load 10.

The box 11 comprises, in turn:

a cylindrical portion 16 having an axis parallel to the axis X of the helicopter 1; and a cylindrical portion 17 protruding in a cantilevered manner from the portion 16 parallel to the axis Z and open below.

In particular, the portion 17 is open below and symmetrically to the axis Z to allow the unwinding/winding of the cable 13.

The cable 13 extends along an axis A.

Figure 2:
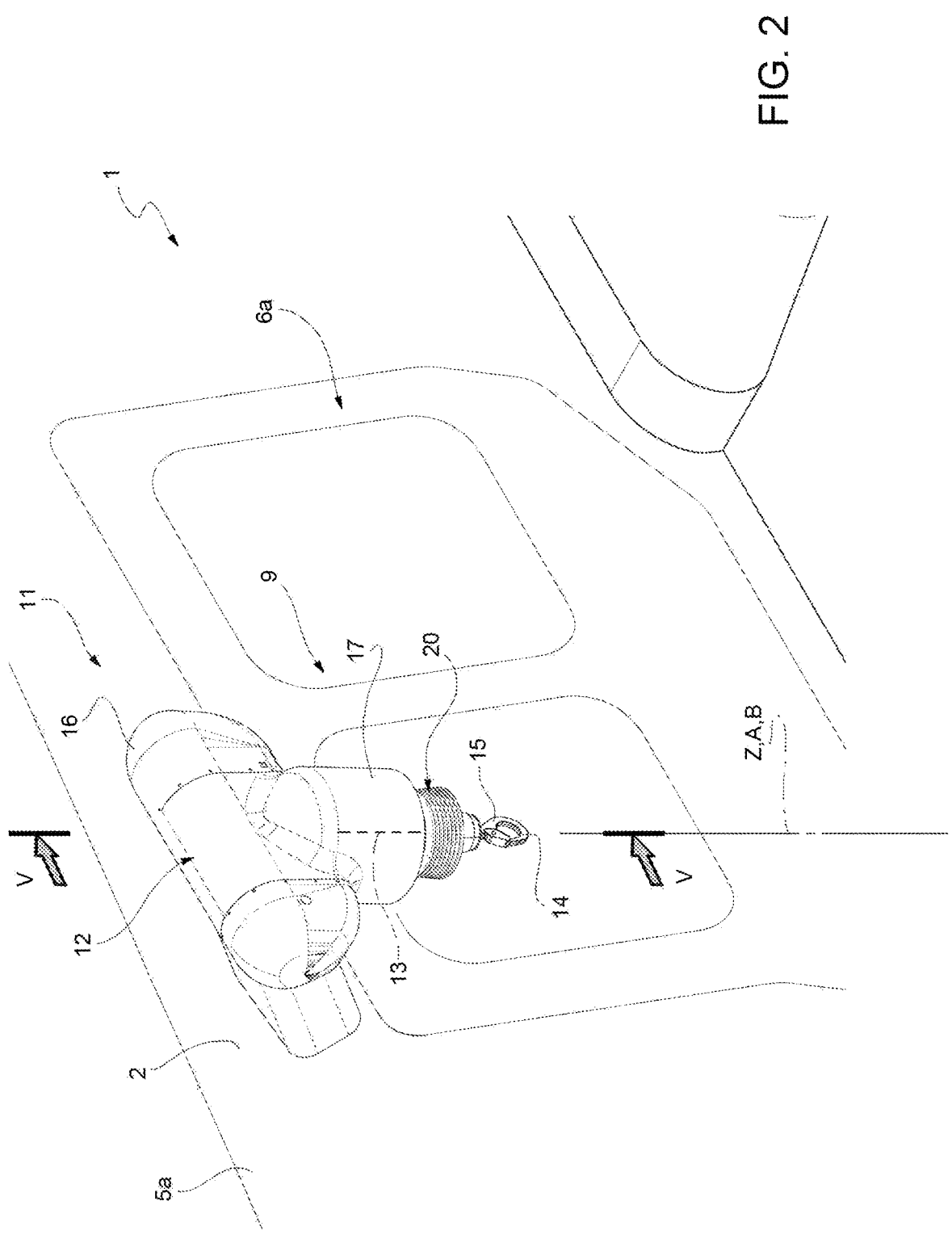
FIG. 2 is a perspective view and on a highly enlarged scale of the aircraft of FIG. 1 with the lifting/lowering device in a lifted position, with parts removed for clarity's sake.
Figure 3:
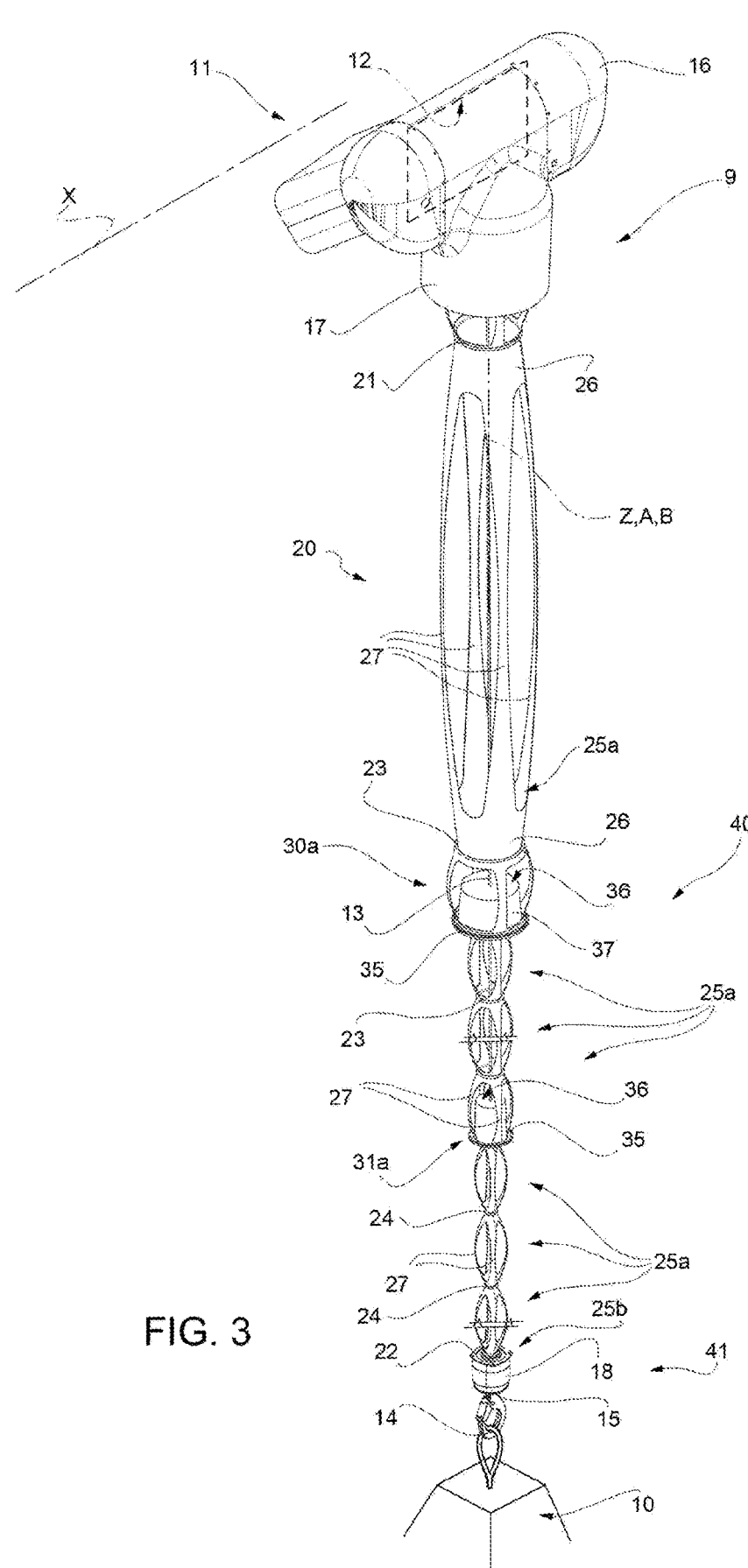
FIG. 3 is a perspective view and on a greatly enlarged scale of the lifting/lowering device of FIGS. 1 and 2, in the lowered position.
Figure 4:
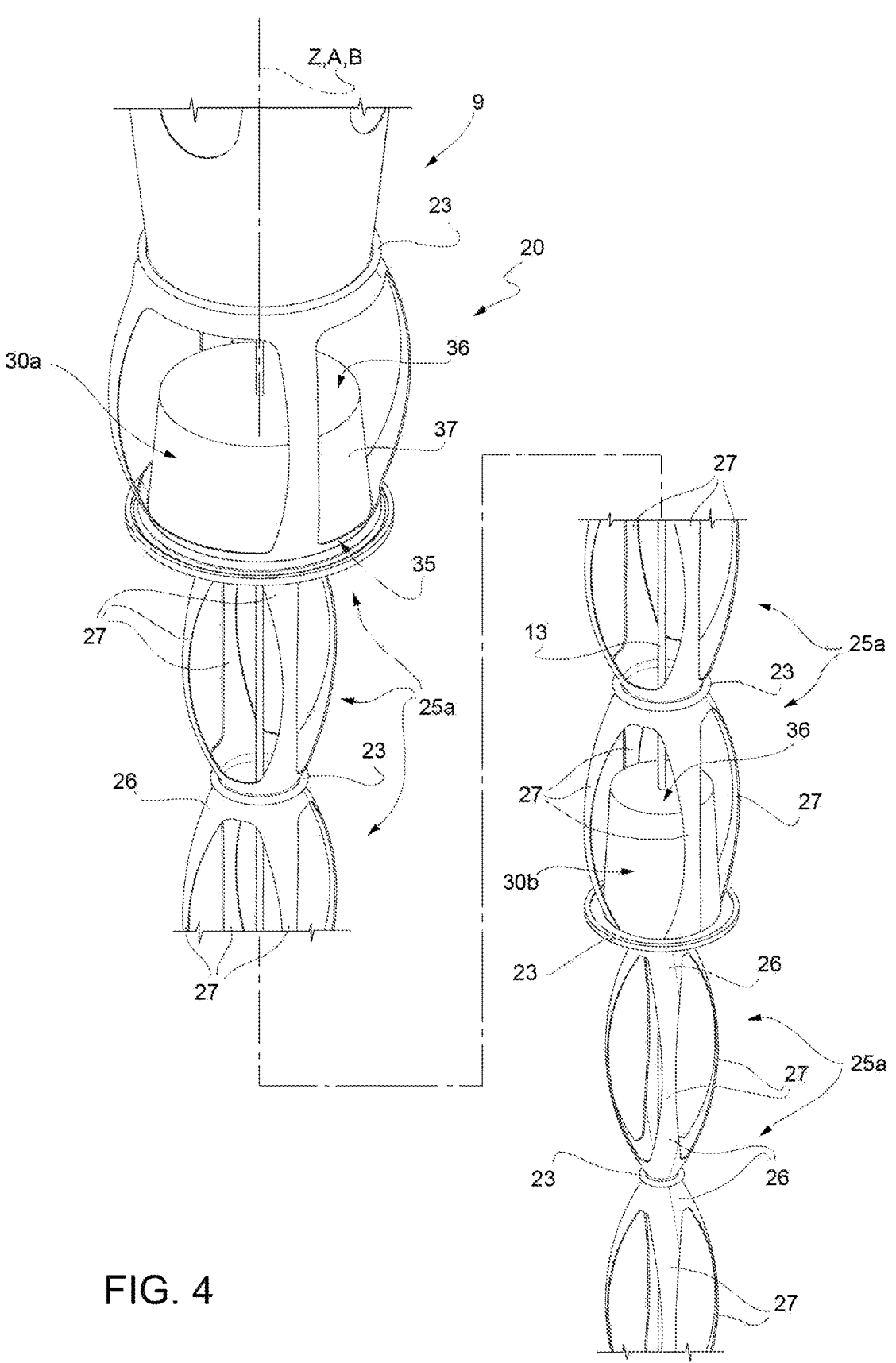
FIG. 4 illustrates some details of FIG. 3 on a further enlarged scale.

The cable 13 is also movable by sliding along the vertical direction between:

a storage position (FIG. 2), in which it is completely wound on the winch 12 inside the portion 17 of the box 11 and in which the hook 14 faces the opening 16; and a plurality of working positions (one of which is illustrated in FIG. 3), in each of which it extends at least partially outside the box 11 for a respective free length along an axis Z arranged in use vertically.

It should be noted that in the following description, expressions such as "above", "below", "upwards", "downwards", and others similar to them are indicated with reference to one of the working positions of the cable 13 in which the axis A is parallel to the axis Z.

The hook 14 is arranged at an end 15 of the cable 13 opposite to the winch 12.

In each working position, the end 15 is at a respective first height. In the storage position, the end 15 is at a second height higher than the first heights.

In other words, the cable 13 is lowered with respect to the fuselage 2 when it moves from the storage position towards each working position, and is lifted with respect to the fuselage 2 when it moves from each working position towards the storage position.

In greater detail, the cable 13 is arranged in the storage position, when the load 10 is hoisted on board the fuselage 2 or when the load 10 is arranged outside the fuselage 2 in order to be lowered.

Otherwise, the cable 13 is arranged in a relative working position, when the load 10 arranged on the ground is coupled to the hook 14.

The cable 13 further comprises a cylindrical element 18 arranged adjacent to the hook 14.

The cable 13 is made of elastically deformable material.

In the case illustrated, the cable 13 is a steel cable.

In case the cable 13 arranged in one of the lowered operating positions is sheared off, the portion of the cable 13 connected to the winch 12 returns elastically upwards and towards the fuselage 2 of the helicopter 1.

The helicopter 1 comprises a sock 20 surrounding the cable 13, when the cable 13 itself is arranged, in use, in one of the working positions: the sock 20 is configured to contain the elastic return of the cable 13, in case the cable 13 is sheared off when the latter is arranged in one of the working positions.

In this way, the sock 20 prevents the cable 13 from hitting and possibly damaging the fuselage 2 and the rotors 3, 4 of the helicopter 1, during its elastic return upwards.

In greater detail, the sock 20 extends along an axis B parallel to the axis Z and can be moved between:

a fully extended position (FIG. 3), in which it extends outside the box 11; and a contracted storage position (FIG. 5), in which it takes less length than the extended position and in which it is partly housed inside the box 11.

The sock 20 is arranged in the fully extended position when the cable 13 is in the working position which corresponds to the maximum free length outside the box 11.

Otherwise, the sock 20 is arranged in the contracted position when the cable 13 is in the storage position.

In this way, following the shearing of the cable 13 arranged in one of the operating positions, the elastic return of the sock 20 is lower than the elastic return of the cable 13. Consequently, the cable 13 remains contained in the casing 20.

Preferably, the free length of the cable 13 arranged outside the box 11 is lower than the free length of the sock 20, when the cable 13 is in one of the operating positions.

In this way, whatever the operating position is, in case of an event that causes the cable to be sheared off, the length of the sock 20 is greater than the maximum breaking length of the cable 13. By way of non-limiting example, the maximum breaking length of the cable 13 is expressed as the sum of the nominal length of the cable 13 in the absence of the load 10 and of the elastic deformation due to the load 10 in the breaking conditions of the cable 13 itself.

In this way, when the cable 13 breaks, the sock 20 remains substantially intact and in place. This allows to hold the cable 13 during its elastic rebound.

A few moments after shearing, the elastic rebound of the cable 13 ceases. The cable 13 remains inside the sock 20, to which the load 10 is still attached.

Subsequently, the load 10 tensions the sock 20 to its maximum length until the breakage thereof is caused.

With reference to FIGS. 2 to 5, the sock 20 has a tubular shape along the axis B.

The sock 20 essentially comprises:

a plurality of rings 21, 22, 23, 24; and a plurality of flexible elements 25*a*, 25*b*, each interposed between a pair of rings 21, 22, 23, 24 consecutive to one another along the axis B.

In the case illustrated, the rings 21, 22, 23, 24 lie on respective planes parallel to each other and orthogonal to the axis B.

As will be described in greater detail below, each flexible element 25*a*, 25*b* is arranged:

in a fully extended position in which it is stretched along the axis B, when the sock 20 is arranged in the fully extended position (FIG. 5); or in a storage position, in which it is folded on itself symmetrically to the axis B, when the sock 20 is arranged in the contracted position (FIG. 2).

The rings 21, 22, 23, 24 are preferably made of self-lubricating material, in order to reduce wear in case of any contact between rings 21, 22, 23, 24 and cable 13.

The sock 20 furthermore comprises a plurality of storage elements 30*a*. 31*a*, 32*a*; 30*b*, 31*b*, 32*b* carried by respective rings 23, 24.

The storage elements 30*a*, 31*a*, 32*a*; 30*b*, 31*b*, 32*b* extend above the respective rings 23, 24 and inside respective flexible elements 25*a*, 25*b* arranged above them.

The storage elements 30*a*, 31*a*. 32*a*; 30*b*, 31*b*, 32*b* are spaced apart from each other along the axis B and interposed between a respective pair of rings 23, 24 consecutive to one another.

In the illustrated case, the storage elements 30*a*, 31*a*, 32*a* are three in number, and the storage elements 30*b*, 31*b*, 32*b* are also three in number.

The storage elements 30*a*, 31*a*, 32*a*; 30*b*, 31*b*, 32*b* are shaped like truncated cones coaxial to the axis B and crossed by the cable 13.

The storage elements 30*a*, 31*a*, 32*a*; 30*b*, 31*b*, 32*b* are tapered, proceeding from the hook 14 towards the box 11, that is from the bottom upwards.

More specifically, each storage element 30*a*, 31*a*, 32*a*; 30*b*, 31*b*, 32*b* comprises (FIG. 4):

a head surface 35 connected to the relative ring 23, 24;

a head surface 36, shaped like a circular crown with a smaller diameter than the surface 35 and axially opposite to the surface 35; and a lateral, truncated-conical surface 37 extending axially between the surfaces 35, 36.

Each storage element 30*a*, 31*a*, 32*a*; 30*b*, 31*b*, 32*b* is, in particular, tapered proceeding from the respective surface 35 towards the relative surface 36.

More particularly, the surfaces 35, 36 are shaped like a circular crown crossed by the cable 13.

The surfaces 35, 36 of the storage element 30*a*. 30*b* have a diameter greater than the surfaces 35, 36 of the storage element 31*a*, 31*b*.

The surfaces 35, 36 of the storage element 31*a*, 31*b* have a diameter greater than the surfaces 35, 36 of the storage element 32*a*, 32*b*.

The distance along the axis B between the surfaces 35, 36 of the storage element 30*a* (30*b*) is greater than the distance along the axis B between the surfaces 35, 36 of the storage element 31*a* (31*b*).

The distance along the axis B between the surfaces 35, 36 of the storage element 31*a* (31*b*) is greater than the distance along the axis B between the surfaces 35, 36 of the storage element 32*a* (32*b*).

The sock 20 also comprises (FIGS. 4 and 5):

a module 40 formed by the rings 21, 23, by the relative flexible elements 25*a* and by the relative storage elements 30*a*, 31*a*, 32*a*; and a module 41 formed by the rings 24, 22, by the relative flexible elements 25*b* and by the relative storage elements 30*b*, 31*b*, 32*b*.

The transition of the sock 20 from the fully extended position to the collapsed position causes the axial collapse of the arms 27 of the flexible elements 25*a*, 25*b* and the axial approach of the rings 21, 22, 23, 24 consecutive to one another. Otherwise, the storage elements 30*a*, 31*a*, 32*a*: 30*b*, 31*b*. 32*b* maintain substantially the same truncated-conical shape during said transition.

With reference to the fully extended position of the sock 20 illustrated in FIG. 3, the rings 21, 22, 23, 24 are spaced apart from each other along the axis 7.

The flexible elements 25*a*, 25*b* are stretched parallel to the axis Z and each interposed between a respective pair of rings 21, 22, 23, 24 consecutive to one another.

The rings 21, 22 define respective axial ends opposite to each other of the sock 20.

More precisely, a first flexible element 25a arranged above is interposed between the portion 17 of the box 11 and the ring 21.

A second flexible element 25a is arranged immediately below the aforesaid first flexible element 25a arranged above and is interposed between the ring 21 and the ring 23 arranged below.

The intermediate flexible elements 25a are interposed between the rings 23.

A flexible element 25a arranged below is interposed between the ring 23 arranged below and the ring 24 arranged above.

The flexible elements 25b arranged above are interposed between respective rings 24.

The flexible element 25b arranged below is interposed between the ring 24 arranged below and the ring 22.

Each flexible element 25a, 25b defines, in the fully extended position:
- a pair of bases 26 opposite to each other and fixed to the respective rings 21, 22, 23, 24; and
- a plurality, four in the case illustrated, of arms 27 angularly equally spaced from each other with respect to the cable 13 and extending between the respective bases 26, so as to allow the operator of the winch 12 to see and/or grasp in his hand the cable 13 sliding inside the element 25a during the operations on the winch 12 itself.

The arms 27 are symmetrical with respect to the B axis and first diverge and then converge, proceeding from the ring 21 towards the ring 22 parallel to the axis B.

The arms 27 of each flexible element 25a, 25b protrude radially to the axis B with respect to the relative rings 21, 22, 23, 24.

The arms 27 define the maximum dimension radially to the axis B of the respective flexible elements 25a, 25b, at a median plane of said flexible elements 25a. 25b equidistant from the respective bases 26. Proceeding from the ring 21 towards the ring 22 parallel to the axis B, the storage devices 30a. 31a, 32a; 30b, 31b, 32b are arranged in sequence.

The flexible elements 25a interposed between the ring 21 and the storage device 30a have a maximum dimension radially to the axis B lower than the diameter of the portion 17 of the box 11 and higher than the area of the surface 35 of the storage element 30a.

The flexible elements 25a (25b) interposed between the storage devices 30a, 31a (31a, 32a; 32a, 30b; 30b, 31b; 31b, 32b) have a maximum dimension radially to the axis B lower than the surface area 35 of the storage element 30a (31a; 32a; 30b; 31b) and higher than the area of the surface 35 of the storage element 31a (32a; 30b; 31b; 32b).

The flexible elements 25b interposed between the storage device 32b and the ring 22 have a maximum dimension radially to the axis B lower than the area of the surface 35 of the storage element 32b.

Figure 5:
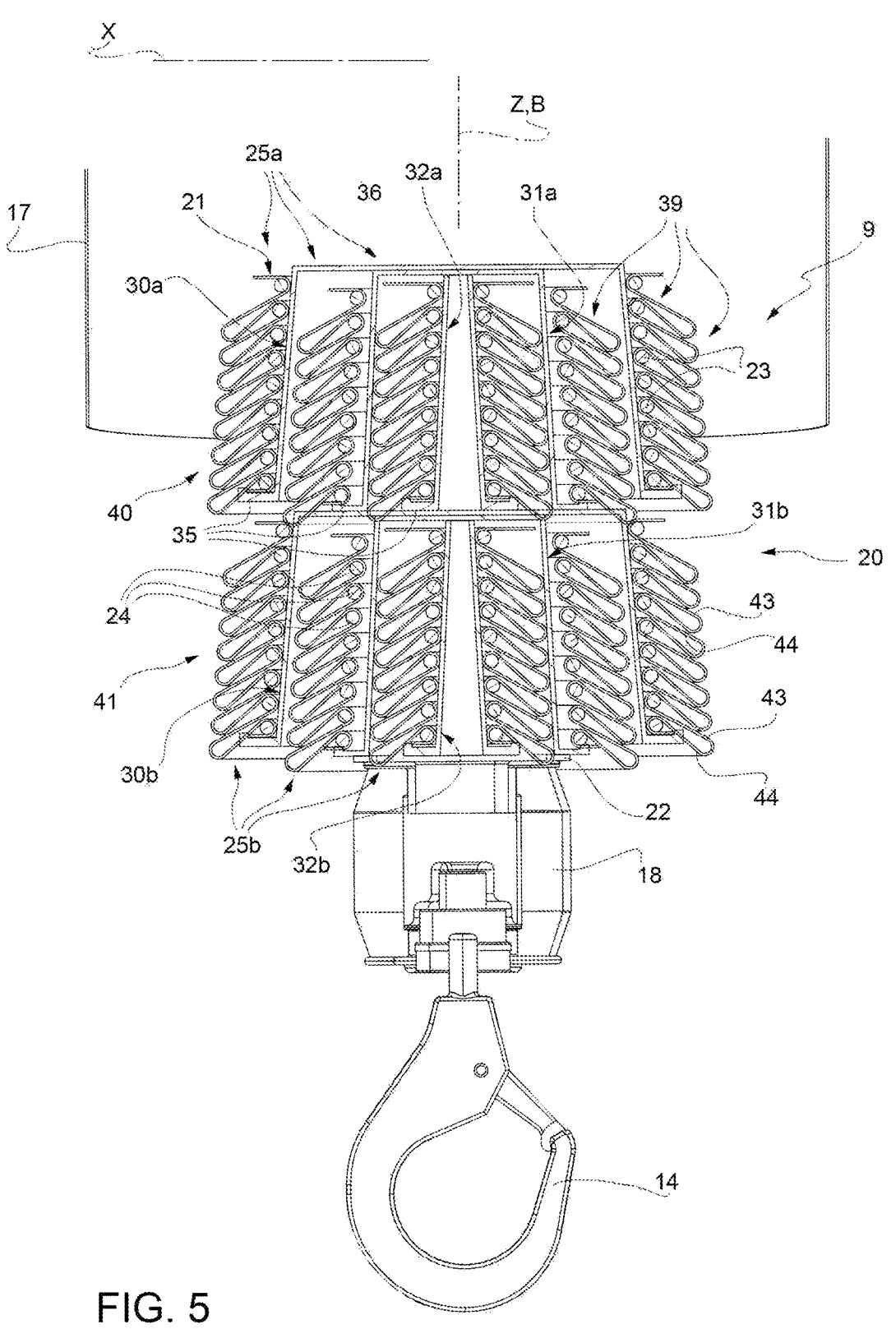
FIG. 5 is a section along the line V-V of FIG. 2 on a greatly enlarged scale.

With reference to the contracted position of the sock 20 illustrated in FIG. 5, the modules 40, 41 are axially superimposed on each other.

The storage device 32a (32b) is arranged radially internal to the storage device 31a (31b).

The storage device 31a (31b) is arranged radially internal to the storage device 30a (30b).

The storage device 30a is partly housed inside the portion 17 of the box 11.

The surfaces 35, 36 of the storage elements 30a. 31a, 32a; 30b, 31b, 32b are in contact with each other axially.

The rings 23 (24) and the flexible elements 25a (25b) axially interposed between the storage elements 31a, 32a

(30a, 31a: 31b, 32b; 30b, 31b) in the extended position of the sock 20 are radially interposed between the same storage elements 31a, 32a (30a, 31a; 31b, 32b; 30b, 31b) in the contracted position of the same sock 20.

The rings 23 and the flexible elements 25a axially interposed between the ring 21 and the storage element 30a in the extended position of the sock 20 are radially interposed between the storage element 30a and the portion 17 of the box 11 in the contracted position of the same sock 20.

The rings 24 and the flexible elements 25b axially interposed between the storage element 32b and the ring 22 in the extended position of the sock 20 are arranged radially external to the storage device 32b in the contracted position of the sock 20.

The arms 27 of the flexible elements 25a, 25b are also folded on themselves so as to form, in longitudinal section with a plane parallel to the axes X, 7, respective pairs of eyelets 39.

With particular reference to FIG. 5, the eyelets 39 are axially in contact with each other parallel to the axis Z and extend between a pair of respective rings 21, 22, 23, 24 consecutive to one another.

More particularly, each eyelet 39 comprises a pair of sections 43, 44 extending downwards and at progressively increasing distances from each other from the respective rings 23, 24.

In the case illustrated, the sock 20 is made of fabric or extruded plastic material.

In a first embodiment, the breaking load of the sock 20 is preferably lower than the breaking load of the cable 13.

Even more preferably, the breaking load of the sock 20 is less than one fifth of the breaking load of the cable 13.

In a second embodiment, the sock 20 is preferably sized so as to break at the ring 21.

For this purpose, the sock 20 comprises, at the ring 21, a sacrificial element (not illustrated) configured in such a way to break at a breaking load value lower than the breaking load value of the remaining part of the sock 20.

Figure 6:
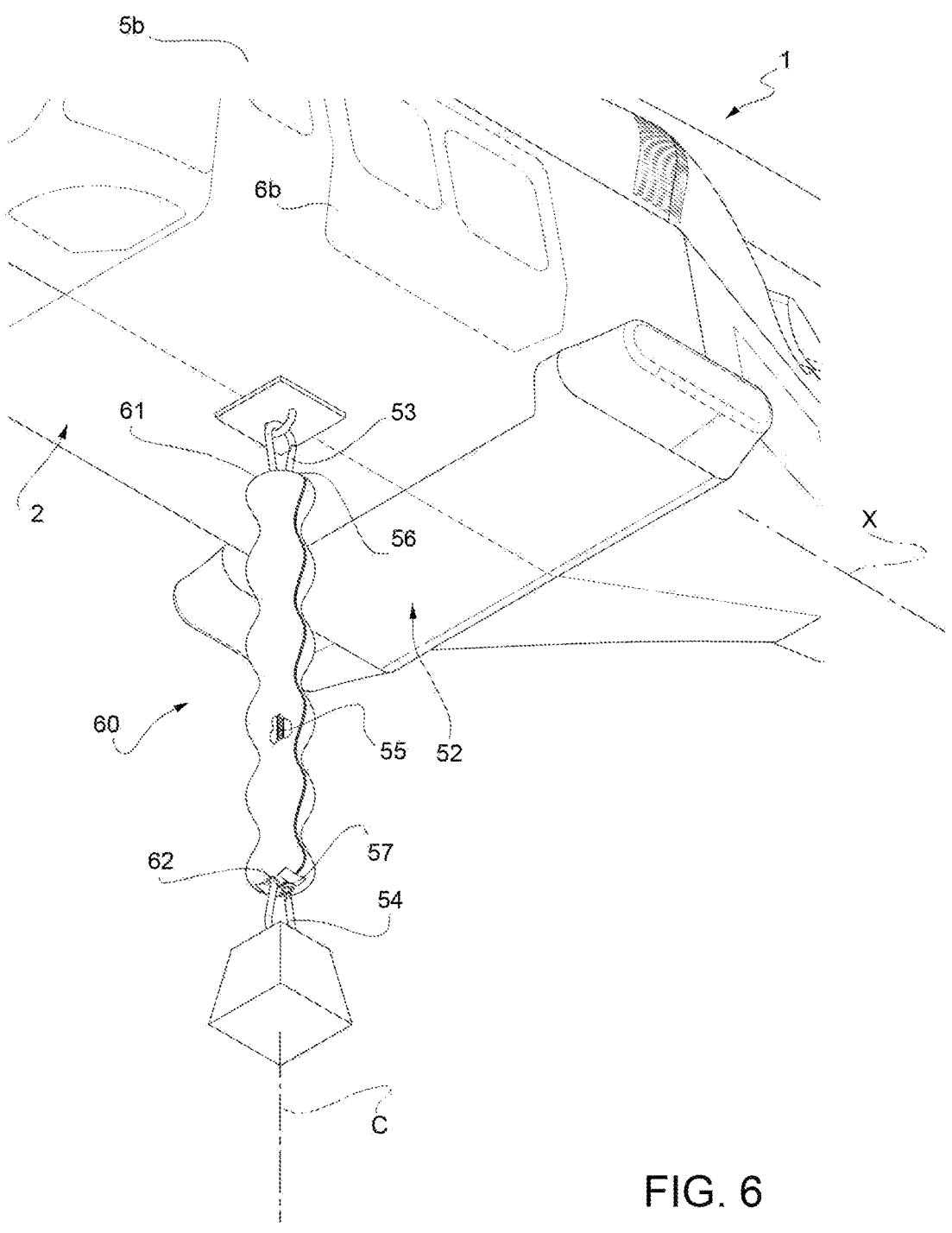
FIG. 6 is a perspective view of the aircraft of FIGS. 1 to 5 with a barycentric hook in a first operating position, with parts removed for clarity's sake.
Figure 7:
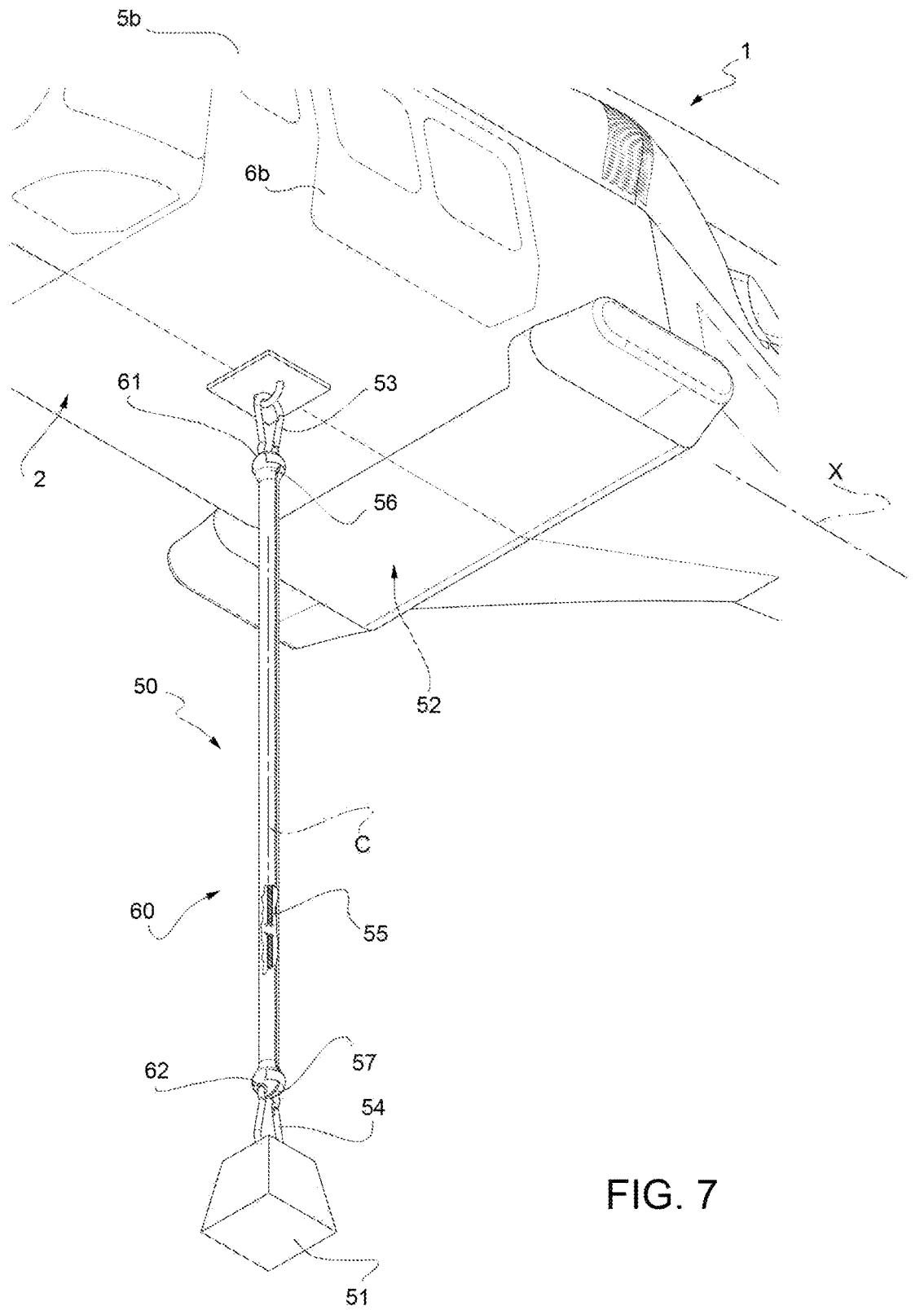
FIG. 7 illustrates the barycentric hook of FIG. 6 in a second operating position.

With reference to FIGS. 6 and 7, the helicopter 1 also comprises a further device 50 adapted to allow the transport of a further load 51.

More precisely, the device 50 is configured to maintain the load 51 at a constant distance from the fuselage 2, without allowing the lifting/lowering thereof with respect to the fuselage 2.

The device 50 is known as a "long line assembly" and essentially comprises (FIG. 6):
- a connector 53 shaped like a hook, hooked to a lower portion 52 of the fuselage 2 and indicated in the sector as a "barycentric hook";
- a connector 54 shaped like a hook and connected to the load 51; and
- a rope 55 having opposite ends 56, 57 connected to the connectors 53, 54.

In a normal operating condition illustrated in FIG. 6, the rope 55 is tensioned by the load 51 and extends along its own axis C arranged vertically and parallel to the axis Z.

In case the rope 55 is sheared off in the normal operating position, the rope 55 connected to the fuselage 2 returns elastically upwards and towards the fuselage 2 of the helicopter 1.

The helicopter 1 comprises a further sock 60 surrounding the rope 55 and configured to contain the elastic return from the rope 55 starting from the normal operating condition, in case the rope 55 itself is sheared off.

In this way, the sock 60 prevents the rope 55 from hitting and possibly damaging the fuselage 2 and the rotors 3, 4 of the helicopter 1, during its elastic return.

The sock 60 has a diameter greater than the rope 55 so as to allow the free movement of the rope 55 itself inside the sock 60, during the elastic return phase.

The sock 60 comprises respective ends 61, 62 is fixed to the connectors 53, 54 and is movable independently of the rope 55.

The length of the sock 60 is greater than the maximum breaking length of the rope 55, i.e. the maximum length reached by the rope 55 under the action of the load 51.

The sock 60 is loose when the rope 55 is tensioned by the load 51.

In this way, similarly to what has been described with regard to the sock 20, when the rope 55 breaks, the load 51 remains suspended from the sock 60 which is still loose and intact.

The sock 60 thus holds the rope 55 during its elastic rebound.

A few moments after shearing, the elastic rebound of the rope 55 ceases without damaging the helicopter 1.

At the same time, the sock 60 is tensioned under the weight of the load 51 still attached thereto, until it breaks allowing the fall of the load 51.

In a first embodiment, the breaking load of the sock 60 is lower than the breaking load of the rope 55.

Even more preferably, the breaking load of the sock 60 is less than one fifth of the breaking load of the rope 55.

In a second embodiment, the sock 60 is preferably sized to break at its end 61.

For this purpose, the sock 60 comprises, at the end 61, a sacrificial element (not illustrated) configured in such a way to break at a breaking load value lower than the breaking load value of the remaining part of the sock 60.

The operation of the helicopter 1 is described starting from a condition in which the cable 13 is arranged in the storage position. In said storage position, the cable 13 is wound on the winch 12 inside the box 11.

In this condition, the sock 20 is in the contracted position of FIG. 5.

In greater detail, the modules 40, 41 are axially superimposed on each other.

The storage device 32a (32b) is arranged radially internally with respect to the storage device 31a (31b).

The storage device 31a (31b) is arranged radially internally with respect to the storage device 30a (30b).

The storage device 30a is partly housed inside the portion 17 of the box 11.

The surfaces 35, 36 of the storage elements 30a, 31a, 32a; 30b, 31b, 32b are in contact with each other axially.

First rings 23 (24) and first flexible elements 25a (25b) are radially interposed between the storage elements 31a, 32a (30a, 31a; 31b, 32b; 30b, 31b) in the contracted position of the same sock 20.

The further rings 23 and the further flexible elements 25a are radially interposed between the storage element 30a and the portion 17 of the box 11.

Second rings 24 and second flexible elements 25b are arranged radially external to the storage device 32b in the contracted position of the sock 20.

The arms 27 of the storage elements 30a, 30b are folded on themselves so as to form respective pairs of eyelets 39.

Starting from this condition, the winch 12 is operated to lower the cable 13 along the vertical direction.

During said movement, the cable 13 comes out of the box 11.

Once the cable 13 has been lowered to the desired height, it is in one of the operating positions.

In said operating position, the load 10 is hoisted onto the hook 14.

When the cable 13 is arranged in the fully lowered operating position, the sock 20 is in the fully extended position (FIG. 3).

The transition from the contracted position to the fully extended position causes the extension of the arms 27. Consequently, in the fully extended position of the sock 20 the rings 21, 22, 23, 24 are spaced apart from each other along the axis Z.

The flexible elements 25a, 25b are each interposed between a pair of rings 21, 22, 23, 24 consecutive to one another.

The rings 21, 22 define respective axial ends opposite to each other of the sock 20.

Proceeding from the ring 21 towards the ring 22 parallel to the axis Z, the storage devices 30a, 31a, 32a; 30b, 31b. 32b are arranged in sequence and axially spaced along the axis Z.

In case the cable 13 is sheared off in the lowered operating position, the portion of the cable 13 connected to the winch 12 returns elastically upwards.

The sock 20, due to the greater length with respect to the cable 13, remains in place for a time sufficient to contain the clastic return of the cable 13.

Hence, the sock 20 prevents the cable 13 from hitting and possibly damaging the fuselage 2 and the rotors 3, 4 of the helicopter 1, during its elastic return.

In the first embodiment, once the elastic energy of the cable 13 has been completely dissipated, the load 10 remains suspended from the sock 20 until the latter breaks in the presence of a stress significantly lower than that necessary to break the cable 13, by way of example, a tensile stress with a value equal to one fifth of that necessary to break the cable 13.

In this way, the upward elastic return of the sock 20 is particularly reduced and no danger of impact against the rotors 3, 4 is created.

In the second embodiment, the sock 20 preferably breaks at the ring 21.

In this way, the elastic return of the sock 20 is directed downwards and no danger of impact against the rotors 3, 4 is created.

The rope 55 is used to transport the load 51 at a constant distance from the fuselage 2, i.e. without lifting or lowering the load 51 with respect to the fuselage 2.

More specifically, the load 51 is hooked to the connector 54 and released with the still flying helicopter 1.

The operation of the helicopter 1 is described below starting from the condition illustrated in FIG. 6, in which the rope 55 is tensioned by the load 51 and extends along its own vertically arranged axis C.

The sock 60 surrounds the rope 55 during the transport of the load 51.

During said transport step of the load 51, the sock 60 is not fully extended, but partly loose.

In the event of overload due for example to the fact that the load 51 gets entangled, the rope 55 is further tensioned until it reaches its maximum length. In said condition, the sock 60 still remains partly loose.

The rope 55 reaches its maximum breaking length until it is sheared off. When the rope 55 gets broken, the sock 60 is still loose.

This is because the length of the sock 60 is greater than the maximum length of the rope 55.

In the moments following the shearing of the rope 55, the elastic energy of the rope 55 ceases in a short time, the load 51 falls and the sock 60 stretches until it is fully tensioned.

At this point, the sock 60 is fully tensioned and lets the load 51 fall, developing a contained elastic return which is not dangerous for the helicopter 1.

In the breaking phase of the rope 55, the sock 60 contains the elastic return of the rope 55.

In greater detail, the sock 60, due to the greater length with respect to the rope 55, remains in place for a time sufficient to contain the elastic return of the rope 55 itself, preventing the elastic return of the latter from hitting and possibly damaging the fuselage 2 and the rotors 3, 4 of the helicopter 1, during its elastic return.

In the first embodiment, once the elastic energy of the rope 55 has been completely dissipated, the load 51 remains suspended from the sock 60 until the latter breaks in the presence of a stress significantly lower than that necessary to break the rope 55 itself.

In this way, the upward elastic return of the rope 55 is particularly reduced and no danger of impact against the rotors 3, 4 is created.

In the second embodiment, the sock 60 preferably breaks at the end 61.

In this way, the elastic return of the sock 60 is directed downwards and no danger of impact against the rotors 3, 4 is created.

From an examination of the characteristics of the helicopter 1 according to the present invention, the advantages that it allows obtaining are evident.

In greater detail, the sock 20, 60 surrounds the respective cable 13/rope 55 arranged in the operating position.

In this way, in case of breakage of the cable 13, the sock 20, 60 contains the elastic return of the cable 13 and the rope 55 respectively.

It is thus possible to avoid or substantially reduce the risk that this elastic return will damage the rotors 3, 4, creating a risk for the safety of the helicopter 1.

The sock 20, 60 has a length respectively greater than the cable 13 and the rope 55, when the latter is in the operating position.

This allows to ensure the containment of the cable 13 and the rope 55 inside the respective sock 20, 60 during the elastic return phase.

In particular, in the first embodiments described above, the load 10, 51 remains suspended from the relative sock 20, 60 until the latter breaks in the presence of a stress significantly lower than that necessary to break the cable 13 and the rope 55.

In this way, when it breaks, the sock 20, 60 develops a lower elastic energy than the respective cable 13 and the rope 55.

This causes an elastic return of the sock 20, 60 substantially lower than the elastic return of the cable 13 and the rope 55 respectively.

It is thus reduced the risk of impact of the sock 20, 60 against the rotors 3, 4 of the helicopter 1.

In the second embodiments, the sock 20, 60 is preferably sized to break at the ring 21 and the end 61 respectively.

Consequently, the elastic return of the sock 20, 60 is directed towards the end 62, i.e. on the opposite side of the rotors 3, 4. It is thus possible to use a breaking load of the sock 20, 60 comparable with that of the cable 13 and the rope 55.

In this way, the sock 20, 60 on the one hand allows to contain the elastic return of the cable 13 and the rope 55 respectively. On the other hand, the reduced upward elastic return or the downward return of the sock 20, 60 do not cause a substantial risk of impact against the rotors 3, 4 of the helicopter 1.

The flexible elements 25a, 25b of the sock 20 have a lower length when the cable 13 is in the storage position and a greater length when the cable 13 is in the operating position.

In this way, the sock 20 takes a reduced length when the cable 13 is in the storage position, and can consequently accompany the reduction of free length of the cable 13 outside the box 11, during the descent/ascent of the cable 13.

The storage elements 30a, 30b; 31a, 31b; 32a, 32b perform a centering function of the flexible elements 25a, 25b, when the sock 20 moves from the extended to the contracted position. In this way, the storage elements 30a. 30b: 31a, 31b: 32a, 32b make the correct folding of the flexible elements 25a. 25b particularly reliable and repeatable, when the sock 20 moves from the extended to the contracted position.

The self-lubricating material of the rings 21, 22, 23, 24 allows to reduce the wear in case of any contact between rings 21, 22, 23, 24 and cable 13.

The sock 60 and the rope 55 are connected to the connectors 53, 54 independently of each other.

Thanks to this, the sock 60 can effectively contain, in case of accidental breakage of the rope 55, the elastic return of the rope 55 itself intended to maintain the load 51 at a constant distance from the fuselage 2.

The sock 60 also allows to protect the rope 55 from atmospheric agents and from the collision against sharp and cutting bodies.

The socks 20, 60 are made of particularly light materials that do not increase the overall weight of the helicopter 1. By way of example, the socks 20, 60 can be made of extruded plastic (therefore non-woven) material or by weaving.

The socks 20, 60 are made with a reversible lateral opening system so that they can be easily and quickly installed around the cable 13 or the rope 55. By way of example, the lateral opening system may comprise portions with Velcro®, snap buttons or a zip.

The sock 20, 60 also allows an easy inspection of the cable 13 and the rope 55 respectively.

In addition, the sock 20, 60 does not alter the mechanical properties of the cable 13 and the rope 55 respectively, with particular reference to the stiffness and robustness of the cable 13 and the rope 55 themselves.

Finally, it is clear that modifications and variations can be made to the aircraft 1 previously described without thereby departing from the scope of protection of the present invention.

The helicopter 1 could in particular be a convertiplane.

What is claimed is:

1. An aircraft comprising:

a fuselage;

a rotor assembly configured to permit the aircraft to hover; and a support element adapted to support a load, made of elastically deformable material and constrained to said fuselage;

said support element being movable in at least one operating position in which it is arranged at least partially outside said fuselage and supports said load;

said support element being a rope comprising first ends opposite to each other and directly connected one to a first connector connected to said fuselage and the other one to a second connector connected to said load, so as to maintain said load at a fixed distance from said fuselage when said rope is arranged in the at least one operating position;

said aircraft further comprising a sock surrounding said support element, when said support element is arranged, in use, in said at least one operating position;

wherein said sock comprises, in turn, second ends opposite to each other and directly connected one to said first connector and the other one to said second connector independently of the respective said first ends of said support element;

said sock being configured to contain an elastic return of said support element, in case said support element arranged, in use, in said at least one said operating position is sheared off;

said sock having a first length greater than a second breaking length of said support element in a presence of a load parallel to a first extension axis of said support element in said at least one operating position, so that when said support element in use breaks, said sock remains intact at said second breaking length;

said second breaking length being a maximum breaking length reached, in use, by said support element under the action of said load;

wherein said sock has a breaking section at one of its ends arranged on a side of said fuselage and opposite to said load.

2. The aircraft of claim 1, wherein said maximum breaking length is the sum of a nominal length of said support element in the absence of said load and of the elastic deformation due, in use, to said load in breaking conditions of said second element.

3. The aircraft according to claim 1, wherein said sock has a first breaking load lower than a second breaking load of said support element; said first breaking load being less than one fifth of said second breaking load.

4. The aircraft according to claim 1, wherein said aircraft comprises one of a helicopter, a convertiplane, and a drone.

5. An aircraft comprising:
a fuselage;
a rotor assembly configured to permit the aircraft to hover; and a support element adapted to support a load, made of elastically deformable material and constrained to said fuselage;

said support element being movable in at least one operating position in which it is arranged at least partially outside said fuselage and supports said load;

said support element being a rope comprising first ends opposite to each other and connected one to a first connector connected to said fuselage and the other one to a second connector connected to said load, so as to maintain said load at a fixed distance from said fuselage when said rope is arranged in the at least one operating position;

said aircraft further comprising a sock surrounding said support element, when said support element is arranged, in use, in said at least one operating position;

wherein said sock comprises, in turn, second ends opposite to each other and connected one to said first connector and the other one to said second connector independently of the respective said first ends of said support element;

said sock being configured to contain an elastic return of said support element, in case said support element arranged, in use, in said at least one said operating position is sheared off;

said sock having a first length greater than a second breaking length of said support element in a presence of a load parallel to a first extension axis of said support element in said at least one operating position, so that when said support element in use breaks, said sock remains intact at said second breaking length, said second breaking length being a maximum breaking length reached, in use, by said support element under the action of said load;

wherein said sock has a breaking section at one of its ends arranged on a side of said fuselage and opposite to said load, wherein said breaking section is constructed to break at a breaking load value less than the breaking load value of a remaining part of the sock.

6. The aircraft according to claim 5, wherein the breaking load value of the breaking section is less than one fifth of the breaking load value of the remaining part of the sock.

* * * * *